US009225252B2

(12) United States Patent
Drakshapalli et al.

(10) Patent No.: US 9,225,252 B2
(45) Date of Patent: Dec. 29, 2015

(54) REDUCTION OF SUPPLY CURRENT VARIATIONS USING COMPENSATION CURRENT CONTROL

(71) Applicant: Cirrus Logic, Inc., Austin, TX (US)

(72) Inventors: Prashanth Drakshapalli, Austin, TX (US); Rahul Singh, Austin, TX (US); Siddharth Maru, Austin, TX (US); John L. Melanson, Austin, TX (US)

( * ) Notice: Subject to any disclaimer, the term of this patent is extended or adjusted under 35 U.S.C. 154(b) by 0 days.

(21) Appl. No.: 14/203,755

(22) Filed: Mar. 11, 2014

(65) Prior Publication Data

US 2014/0252975 A1   Sep. 11, 2014

Related U.S. Application Data

(60) Provisional application No. 61/766,094, filed on Mar. 11, 2013.

(51) Int. Cl.
*H05B 37/02* (2006.01)
*H02M 3/335* (2006.01)
*H05B 33/08* (2006.01)

(52) U.S. Cl.
CPC ....... *H02M 3/33507* (2013.01); *H05B 33/0815* (2013.01); *Y02B 20/347* (2013.01)

(58) Field of Classification Search
USPC ......... 315/210, 224, 247, 274, 291, 307, 308; 363/21.12, 21.16, 21.18
See application file for complete search history.

(56) References Cited

U.S. PATENT DOCUMENTS

| | | | |
|---|---|---|---|
| 6,229,292 | B1 | 5/2001 | Redl et al. |
| 6,621,256 | B2 | 9/2003 | Muratov et al. |
| 6,724,174 | B1 | 4/2004 | Esteves et al. |
| 6,734,639 | B2 | 5/2004 | Chang et al. |
| 6,940,733 | B2 | 9/2005 | Schie et al. |
| 7,099,163 | B1 | 8/2006 | Ying |
| 7,102,902 | B1 | 9/2006 | Brown et al. |
| 7,145,295 | B1 | 12/2006 | Lee et al. |
| 7,276,861 | B1 | 10/2007 | Shteynberg et al. |

(Continued)

FOREIGN PATENT DOCUMENTS

| | | |
|---|---|---|
| EP | 0636889 | 1/1995 |
| EP | 1289107 A3 | 5/2003 |

(Continued)

OTHER PUBLICATIONS

International Search Report, PCT/US2014/023372, European Patent Office, Jun. 27, 2014, pp. 1-3.

(Continued)

*Primary Examiner* — Tung X Le
(74) *Attorney, Agent, or Firm* — Terrile, Cannatti, Chambers & Holland, LLP; Kent B. Chambers

(57) ABSTRACT

A power distribution system and method includes a controller that is configured to control a switching power converter. In at least one embodiment, the controller includes a compensation current control circuit to control a compensation current that reduces and, in at least one embodiment, approximately eliminates variations in current drawn by the controller during a particular operational time period. In at least one embodiment, the power distribution system is a lamp that includes the controller, a switching power converter, and one or more light sources, such as light emitting diodes.

26 Claims, 6 Drawing Sheets

(56) References Cited

U.S. PATENT DOCUMENTS

| | | | |
|---|---|---|---|
| 7,310,244 | B2 | 12/2007 | Yang et al. |
| 7,388,764 | B2 | 6/2008 | Huynh et al. |
| 7,642,762 | B2 | 1/2010 | Xie et al. |
| 7,710,047 | B2 | 5/2010 | Shteynberg et al. |
| 7,719,248 | B1 | 5/2010 | Melanson |
| 7,751,208 | B2 * | 7/2010 | Jacques et al. ............. 363/21.02 |
| 7,759,881 | B1 | 7/2010 | Melanson |
| 7,786,711 | B2 | 8/2010 | Wei et al. |
| 7,804,256 | B2 | 9/2010 | Melanson |
| 7,852,017 | B1 | 12/2010 | Melanson |
| 7,880,400 | B2 | 2/2011 | Zhou et al. |
| 8,222,832 | B2 | 7/2012 | Zheng et al. |
| 8,947,017 | B2 * | 2/2015 | Kikuchi et al. ............... 315/307 |
| 2004/0196672 | A1 | 10/2004 | Amei |
| 2005/0231183 | A1 | 10/2005 | Li et al. |
| 2006/0022916 | A1 | 2/2006 | Aiello |
| 2006/0214603 | A1 | 9/2006 | Oh |
| 2006/0261754 | A1 | 11/2006 | Lee |
| 2006/0285365 | A1 | 12/2006 | Huynh |
| 2007/0024213 | A1 | 2/2007 | Shteynberg |
| 2007/0170873 | A1 | 7/2007 | Mishima |
| 2007/0182338 | A1 | 8/2007 | Shteynberg |
| 2007/0285031 | A1 | 12/2007 | Shteynberg |
| 2008/0062584 | A1 | 3/2008 | Freitag et al. |
| 2008/0062586 | A1 | 3/2008 | Apfel |
| 2008/0174291 | A1 | 7/2008 | Hansson |
| 2008/0224636 | A1 | 9/2008 | Melanson |
| 2008/0259655 | A1 | 10/2008 | Wei |
| 2009/0059632 | A1 | 3/2009 | Li et al. |
| 2009/0079357 | A1 * | 3/2009 | Shteynberg et al. .......... 315/291 |
| 2009/0108677 | A1 | 4/2009 | Walter et al. |
| 2009/0184665 | A1 | 7/2009 | Ferro |
| 2009/0284182 | A1 | 11/2009 | Cencur |
| 2010/0066328 | A1 | 3/2010 | Shimizu et al. |
| 2010/0128501 | A1 | 5/2010 | Huang et al. |
| 2010/0141317 | A1 | 6/2010 | Szajnowski |
| 2010/0148681 | A1 * | 6/2010 | Kuo et al. ..................... 315/193 |
| 2010/0213857 | A1 | 8/2010 | Fan |
| 2010/0213859 | A1 | 8/2010 | Shteynberg |
| 2010/0238689 | A1 | 9/2010 | Fei et al. |
| 2010/0244726 | A1 | 9/2010 | Melanson |
| 2011/0199793 | A1 | 8/2011 | Kuang et al. |
| 2011/0276938 | A1 | 11/2011 | Perry et al. |
| 2012/0248998 | A1 | 10/2012 | Yoshinaga |

FOREIGN PATENT DOCUMENTS

| | | |
|---|---|---|
| WO | 2004051834 A1 | 6/2004 |
| WO | 2007016373 A3 | 2/2007 |
| WO | 2008004008 A2 | 1/2008 |
| WO | 2010065598 A2 | 6/2010 |
| WO | 2010065598 | 10/2010 |

OTHER PUBLICATIONS

Written Opinion, PCT/US2014/023372, European Patent Office, Jun. 27, 2014, pp. 1-5.

Brkovic, Milivoje, Automatic Current Shaper with Fast Output Regulation and Soft-Switching, Telecommunications Energy Conference, INTELEC '93. 15th International, Sep. 27-30, 1993, pp. 379-386, vol. 1, California Institute Technology, Pasadena, California USA.

Dilouie, Craig, Introducing the LED Driver, Electrical Construction & Maintenance (EC&M), Sep. 1, 2004, ,pp. 28-32, Zing Communications, Inc., Calgary, Alberda, Canada.

Spiazzi, Giorgio, Simone Buso and Gaudenzio Meneghesso, Analysis of a High-Power-Factor Electronic Ballast for High Brightness Light Emitting Diode, Power Electronics Specialist Conference, 2005. PESC '05, IEEE 36th, pp. 1494-1499, 2005, Dept. of Information Engineering, University of Padova, Padova, Italy.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

* cited by examiner

REDUCTION OF SUPPLY CURRENT VARIATIONS USING COMPENSATION CURRENT CONTROL

CROSS-REFERENCE TO RELATED APPLICATION

This application claims the benefit under 35 U.S.C. §119 (e) and 37 C.F.R. §1.78 of U.S. Provisional Application No. 61/776,094, filed Mar. 11, 2013, which is incorporated by reference in its entirety.

BACKGROUND OF THE INVENTION

1. Field of the Invention

The present invention relates in general to the field of electronics, and more specifically to a system and method of reducing supply current variations using compensation current control.

2. Description of the Related Art

Many electronic systems utilize switching power converters to efficiently convert power from one source into power useable by a device (referred to herein as a "load"). For example, power companies often provide alternating current (AC) power at specific voltages within a specific frequency range. However, many loads utilize power at a different voltage and/or frequency than the supplied power. For example, some loads, such as light emitting diode (LED) based lamps operate from a direct current (DC). "DC current" is also referred to as "constant current". "Constant" current does not mean that the current cannot change over time. The DC value of the constant current can change to another DC value. Additionally, a constant current may have noise or other minor fluctuations that cause the DC value of the current to fluctuate. "Constant current devices" have a steady state output that depends upon the DC value of the current supplied to the devices.

LEDs are becoming particularly attractive as main stream light sources in part because of energy savings through high efficiency light output, long life, and environmental incentives such as the reduction of mercury. LEDs are semiconductor devices and are best driven by direct current. The brightness of the LED varies in direct proportion to the DC current supplied to the LED. Thus, increasing current supplied to an LED increases the brightness of the LED and decreasing current supplied to the LED dims the LED.

FIG. 1 depicts a power distribution system 100 that includes a leading edge, phase-cut dimmer 102. FIG. 2A depicts ideal, exemplary voltage graphs 200 associated with the power distribution system 100. Referring to FIGS. 1 and 2, the lighting system 100 receives an AC supply voltage $V_{IN}$ from voltage supply 104. The supply voltage $V_{IN}$, indicated by voltage waveform 202, is, for example, a nominally 60 Hz/110 V line voltage in the United States of America or a nominally 50 Hz/220 V line voltage in Europe. A leading edge dimmer 102 phase cuts leading edges, such as leading edges 204 and 206, of each half cycle of supply voltage $V_{IN}$. Since each half cycle of supply voltage $V_{IN}$ is 180 degrees of the input supply voltage $V_{IN}$, the leading edge dimmer 102 phase cuts the supply voltage $V_{IN}$ at an angle greater than 0 degrees and less than 180 degrees. Generally, the voltage phase cutting range of a leading edge dimmer 102 is 10 degrees to 170 degrees. "Phase cutting" the supply voltage refers to modulating a leading edge phase angle of each cycle of an alternating current ("AC") supply voltage. "Phase cutting" of the supply voltage is also commonly referred to as "chopping". Phase cutting the supply voltage reduces the average power supplied to a load, such as a lighting system, and thereby controls the energy provided to the load.

The input signal voltage $V_{\phi\_IN}$ to the lighting system 100 represents a dimming level that causes the lighting system 100 to adjust power delivered to a lamp 122, and, thus, depending on the dimming level, increase or decrease the brightness of the lamp 122. Many different types of dimmers exist. In general, dimmers use a digital or analog coded dimming signal that indicates a desired dimming level. For example, the triac-based dimmer 102 phase cuts a leading edge of the AC input supply voltage $V_{IN}$. The leading edge dimmer 102 can be any type of leading edge dimmer such as a triac-based leading edge dimmer available from Lutron Electronics, Inc. of Coopersberg, Pa. ("Lutron"). A triac-based leading edge dimmer is described in the Background section of U.S. patent application Ser. No. 12/858,164, entitled Dimmer Output Emulation, filed on Aug. 17, 2010, and inventor John L. Melanson.

The phase cut dimmer 102 supplies the input voltage $V_{\phi\_IN}$ as modified by the phase cut dimmer 102 to a full bridge diode rectifier 107. The full bridge rectifier 107 supplies an AC rectified voltage, which is represented by the voltage supply 109 to the switching power converter 108. Capacitor 105 filters high frequency components from rectified voltage $V_{\phi R\_IN}$. To control the operation of switching power converter 108, controller 106 generates a control signal $CS_1$ to control conductivity of field effect transistor (FET) switch 112 to control conductivity of the current control switch 112 of flyback-type switching power converter 110 to control the conversion of the input voltage $V_{IN}$ into a secondary voltage $V_S$. When control signal $CS_1$ causes switch 112 to conduct, a primary-side current $i_{PRIMARY}$ flows into a primary coil 114 of transformer 116 to magnetize the primary coil 114. When control signal $CS_1$ opens switch 112, primary coil 114 demagnetizes. The magnetization and demagnetization of the primary coil 114 induces a secondary voltage $V_S$ across a secondary coil 118 of transformer 116. Primary voltage $V_P$ is N times the secondary voltage $V_S$, i.e. $V_P = N \cdot V_S$, and "N" is a ratio of coil turns in the primary coil 114 to the coil turns in the secondary coil 118. The secondary-side current $i_{SECONDARY}$ is a direct function of the secondary voltage $V_S$ and the impedance of diode 120, capacitor 122, and load 104. Diode 120 allows the secondary-side current $i_{SECONDARY}$ to flow in one direction. The secondary-side current $i_{SECONDARY}$ charges capacitor 122, and capacitor 122 maintains an approximately DC voltage $V_{LOAD}$ across load 104. Thus, secondary-side current $i_{SECONDARY}$ is a DC current. Waveforms 104 depict exemplars of control signal $CS_1$, primary-side current iprimary, and secondary-side current isecondary. It is commonly assumed that the secondary-side current $i_{SECONDARY}$ rises virtually instantaneously after the primary-side winding 114 stops conducting the primary-side current $i_{PRIMARY}$.

Since the control signal $CS_1$ generated by the controller 106 controls the primary-side current $i_{PRIMARY}$, and the primary-side current $i_{PRIMARY}$ controls the voltage $V_P$ across the primary coil 114, the energy transfer from the primary coil 114 to the secondary coil 118 is controlled by the controller 106. Thus, the controller 106 controls the secondary-side current $i_{SECONDARY}$.

The controller 106 operates the switching power converter 110 in a certain mode, such as quasi-resonant mode. In quasi-resonant mode, the control signal $CS_1$ turns switch 112 ON at a point in time that attempts to minimize the voltage across switch 112, and, thus, minimize current through switch 112. Controller 106 generates the control signal $CS_1$ in accordance with a sensed primary-side current $i_{PRIMARY\_SENSE}$, obtained via signal $i_{LINK\_SENSE}$ from link current sense path 126.

Switching power converters convert power received from a power source, such as a voltage supply, into power suitable for a load. The power received from the voltage supply is referred to as "POWER IN", and the power provided to the load is referred to as "POWER OUT". All switching power converters have some inherent power losses due to, for example, non-ideal component characteristics. Such inherent power losses tend to be minimized so as to increase the efficiency of the switching power converters. Inherent power losses are represented herein by "$P_{INH}$". In some contexts, the amount of power supplied to the switching power converter can exceed the amount of power provided by the switching power converter to a load, i.e. POWER IN>POWER OUT+ $P_{INH}$. When the POWER IN is greater than the POWER OUT+$P_{INH}$, the switching power converter passively dissipates the excess energy using passive resistors.

A dimmable lighting system that includes a low power lamp as the load 104, such as one or more light emitting diodes (LEDs), represents one context when the POWER IN to the switching power converter can be greater than the POWER OUT+$P_{INH}$ of the switching power converter. In this exemplary context, the switching power converter receives current through a triode for alternating current ("triac") based dimmer 102. Once the triac-based dimmer 102 begins conducting during a cycle of an alternating current ("AC") supply voltage $V_{IN}$ to prevent the triac from disadvantageously, prematurely disconnecting during mid-cycle of the supply voltage, the switching power converter 110 draws a minimum current referred to as a "hold current." As long as an input current $i_{PRIMARY}$ to the switching power converter 110 is greater than or equal to the hold current, the triac-based dimmer 102 should not prematurely disconnect. For a leading edge dimmer, a premature disconnect occurs when the dimmer begins conducting and stops conducting prior to reaching a zero crossing of the supply voltage. Premature disconnects can cause problems with the lighting system, such as flicker and instability.

Thus, to prevent premature disconnection of the triac-based dimmer, the minimum POWER IN to the switching power converter 110 equals the hold current ("$i_{HOLD}$") times an input voltage "$V_{IN}$" to the switching power converter 110.

SUMMARY OF THE INVENTION

In one embodiment of the present invention, an apparatus includes a controller to control a switching power converter. The controller includes first circuitry that, during at least one operational time period of the controller, is configured to draw a time varying operational current from an external power source. The controller also includes a compensation current control circuit to generate a compensation current control signal to control a draw of a compensation current from the external power source by second circuitry so that an average sum of the time varying operational current and the compensation current is approximately constant as the operational current varies in time during the operational time period.

In a further embodiment of the present invention, a method includes drawing a time varying operational current in a first circuit of a controller from an external power source during at least one operational time period of the controller, wherein the controller is configured to control a switching power converter. The method further includes generating a compensation current control signal to control a draw of a compensation current from the external power source by second circuitry so that an average sum of the time varying operational current and the compensation current is approximately constant as the operational current varies in time during the operational time period.

In another embodiment of the present invention, a lamp includes a light source and a switching power converter coupled to the light source. The lamp further includes a controller, coupled to the switching power converter, to control a switching power converter. The controller includes first circuitry that, during at least one operational time period of the controller, is configured to draw a time varying operational current from an external power source. The controller further includes a compensation current control circuit to generate a compensation current control signal to control a draw of a compensation current from the external power source by second circuitry so that a sum of the time varying operational current and the compensation current is approximately constant as the operational current varies in time.

FIG. 2B depicts a voltage regulator 250 that includes an adjustable shunt regulator 252 to regulate the output voltage $V_{OUT}$. The input voltage $V_{IN}$ provides a supply voltage and current. The shunt regulator 252 includes a reference terminal 253 that sets the regulated voltage of the shunt regulator 252. The voltage at the reference terminal is set by the resistor voltage divider of resistors 254 and 256. The shunt regulator 252 maintains the output voltage $V_{OUT}$ across the output capacitor 260, and resistor 250 damps current to the output capacitor 260. The shunt regulator is, for example, a TL430 available from Texas Instruments, Inc. of Tex., U.S.A.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
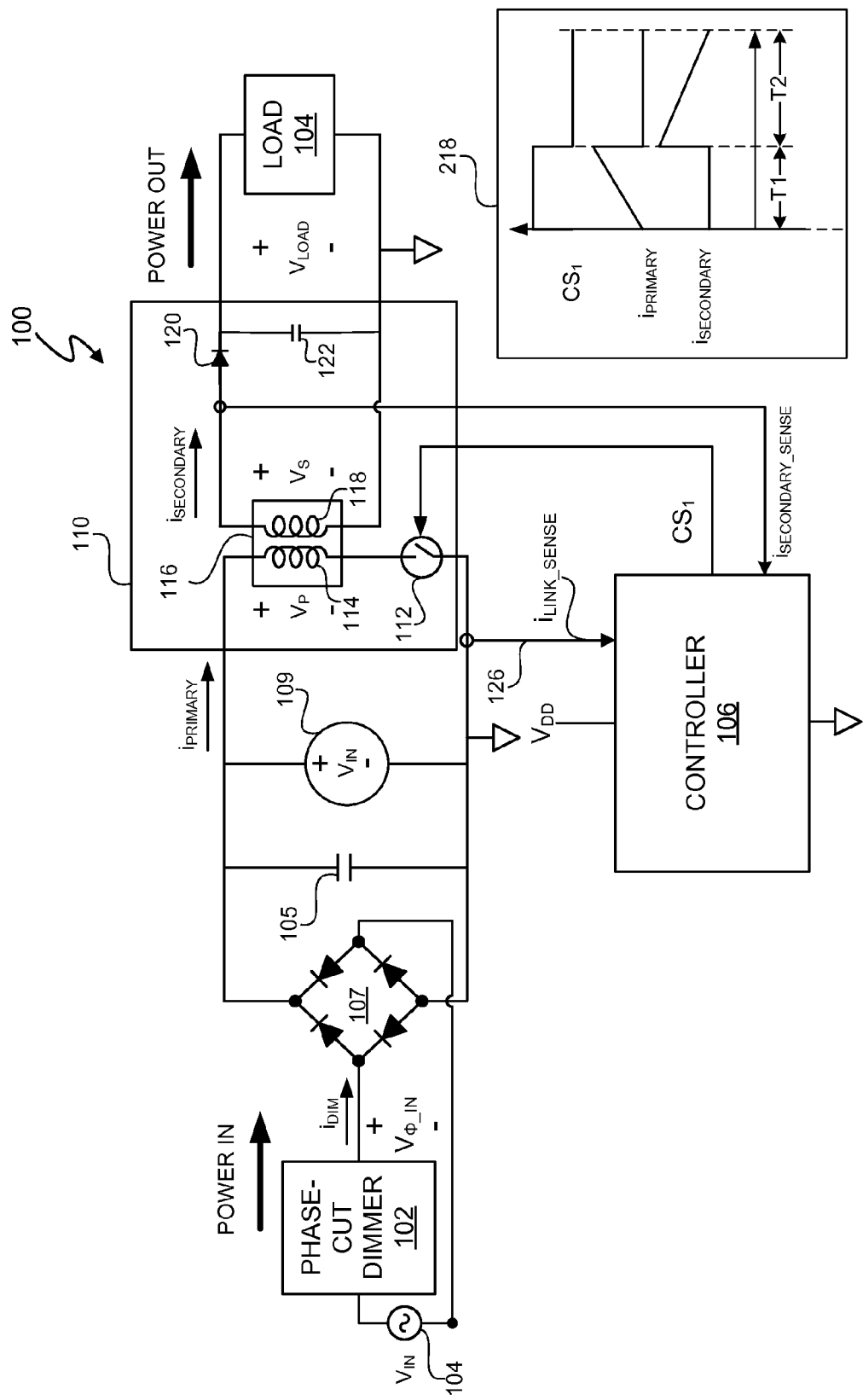
FIG. 1 (labeled prior art) depicts a power distribution system that includes a leading edge, phase-cut dimmer.
Figure 2A:
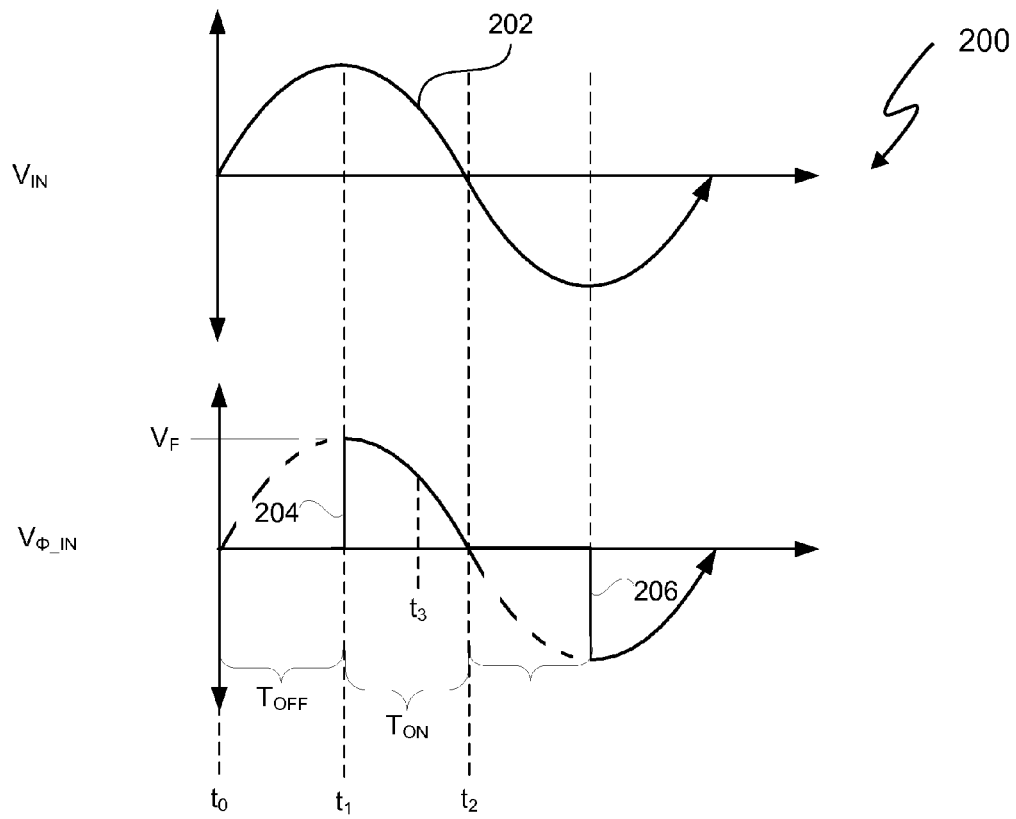
FIG. 2A (labeled prior art) depicts ideal, exemplary voltage graphs associated with the power distribution system of FIG. 1.
Figure 2B:
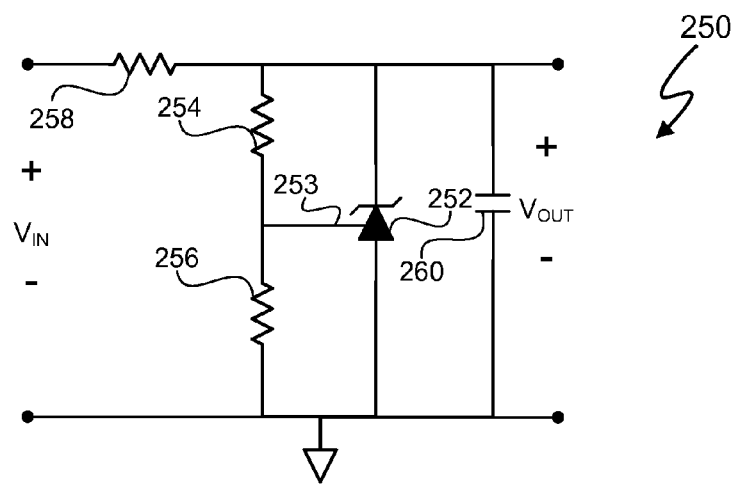
FIG. 2B (labeled prior art) depicts a shunt regulator.

A power distribution system and method includes a controller that is configured to control a switching power converter. In at least one embodiment, the controller includes a compensation current control circuit to control a compensation current that reduces and, in at least one embodiment, approximately eliminates variations in current drawn by the controller during a particular operational time period. The operational time period is a matter of design choice and is, in at least one embodiment, a half line cycle of an alternating current (AC) voltage supply. The controller includes circuitry that draws current that varies over time depending on the operational status and operating conditions of the circuitry. In at least one embodiment, the compensation current control circuit draws a compensation current so that the average total current drawn by the controller is approximately constant over a period of time, thus, approximately eliminating variations in current drawn by the controller during a particular operational time period. In at least one embodiment, the total current drawn by the controller is the sum of an operational current and the compensation current. In at least one embodiment, the compensation current control circuit draws the operational current during a first period of time T1 and draws the compensation current for a second period of time T2 so that during an operational time period the average sum of T1 plus T2 remains a constant $T_{MAX}$. The particular operational time period reference is a matter of design choice. In at least one embodiment, the operational time period comprises a cycle of a rectified supply voltage. In at least one embodiment, the operational time period is one cycle of current drawn by the controller. When the operational time period is one cycle of current drawn by the controller, the total current drawn by the controller is the sum of an operational current and the compensation current provides a constant $T_{MAX}$ for all operational time periods. In at least one embodiment, the value of $T_{MAX}$ remains constant during all operational time periods of the controller. In at least one embodiment, the value of $T_{MAX}$ is dynamic and is adjusted when the maximum operational current during time period T(n) exceeds the value of $T_{MAX}$, wherein "n" is an integer index. The controller then updates the value of $T_{MAX}$ for time periods T(n+m) until the value of the then-current operational current exceeds the then-current value of $T_{MAX}$, and so on. In at least one embodiment, an approximate elimination of variations in total current drawn by the controller during, for example, a cycle or half cycle of an input voltage to the switching power converter is +/−2% variation.

During at least one operational time period, the controller draws a time-varying operational current from an external power source. In some switching power converters that utilize transformers to provide power from the switching power converter to a load, when the controller draws a time varying current, the power provided to the load will vary. For example, in at least one embodiment, the external power source is an auxiliary-winding of the transformer. Time-varying current demands of the controller can cause variations in current in the auxiliary-winding, which can be reflected to a secondary-winding that provides power to the load. Variations in the power provided to the load can cause adverse effects. For example time variations that occur at a visible frequency can manifest as light flicker from a load that includes one or more light emitting diodes.

Figure 3:
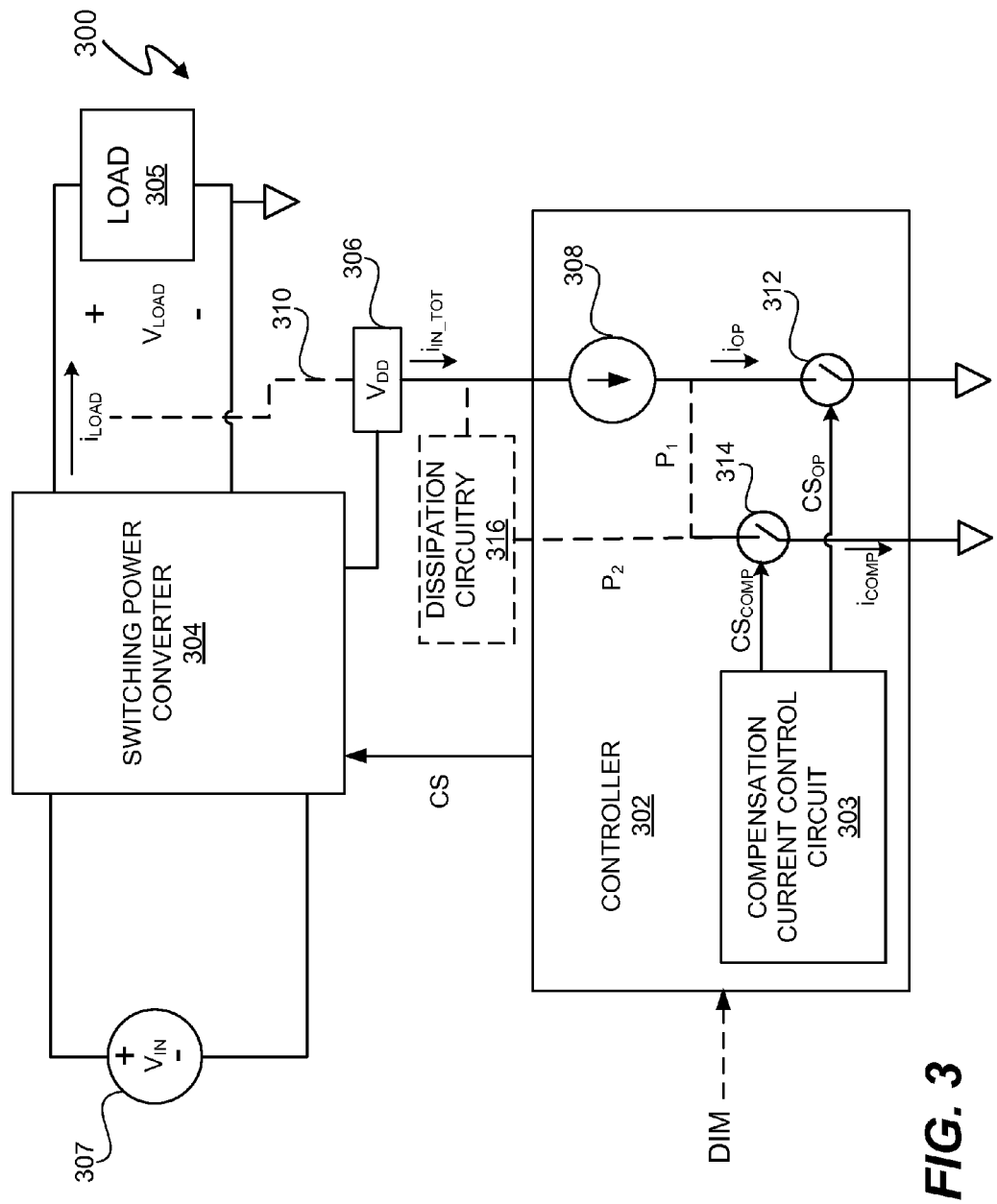
FIG. 3 depicts a power distribution system that includes a compensation current control circuit.

FIG. 3 depicts a power distribution system 300 that includes a controller 302 to control the switching power converter 304. The controller 302 also includes compensation current control circuitry 303 that generates a compensation control signal $CS_{COMP}$ to approximately eliminate variations of the total input current $i_{IN\_TOT}$ drawn by the controller 302 during an operational period of the controller 302. The particular duration of the operational period is a matter of design choice and is, for example, the time period while the controller 302 is generating a control signal CS that causes the switching power converter 304 to convert the power provided by the voltage supply 307 into provided power for the load 305. In at least one embodiment, the operational time period is one or more periods of a cycle or half cycle of an AC input voltage $V_{IN}$ from the voltage supply 307. In at least one embodiment, the voltage supply 307 is the same as the AC rectified voltage, which is represented by the voltage supply 109 (FIG. 1). In at least one embodiment, an approximate elimination of variations in the total input current $i_{IN\_TOT}$ drawn by the controller 302 is +/−2% variation during, for example, a cycle or half cycle of the input voltage $V_{IN}$ or of a supply voltage, such as an input voltage $V_{IN}$ from a voltage supply 104.

The controller 302 receives power from an external power supply 306 that supplies a voltage $V_{DD}$. The external power supply 306 derives power from the switching power converter 304, such as an auxiliary-winding of transformer of the switching power converter as subsequently discussed in more detail with reference to FIG. 6. The controller 302 draws a total input current $i_{IN\_TOT}$ from the power supply 306. Current sink 308 represents circuitry that draws current in the controller 302. The dotted line 310 indicates that variations in the current $i_{IN\_TOT}$ supplied by the voltage supply 306 affect the load current $i_{LOAD}$. Variations in the load current $i_{LOAD}$ vary the power delivered to the load 305 and can have noticeable, adverse effects. For example, in at least one embodiment, the load 305 includes one or more LEDs. When the power varies to the load 305, the brightness of the LEDs changes, which can be perceived by a human as undesirable light flicker.

In at least one embodiment, the compensation current control circuit 303 operates at all dim levels indicated by the DIM signal. In at least one embodiment, for some dim levels, the compensation current control circuit 303 disables the compensation current control signal $CS_{COMP}$, by, for example, not generating any pulses of the compensation current control signal $CS_{COMP}$. For example, in at least one embodiment, for a dim level signal DIM indicating full brightness of a load 305 that includes a light source, such as one or more light emitting diodes, the controller 302 drives the load 305 to full power. At full power, in at least one embodiment, there will be no noticeable power fluctuations. In at least one embodiment, the compensation current control circuit 303 is further configured to disable the compensation current control signal $CS_{COMP}$ when the controller 302 controls the switching power converter 304 to provide full output power to the load 305.

Figure 4:
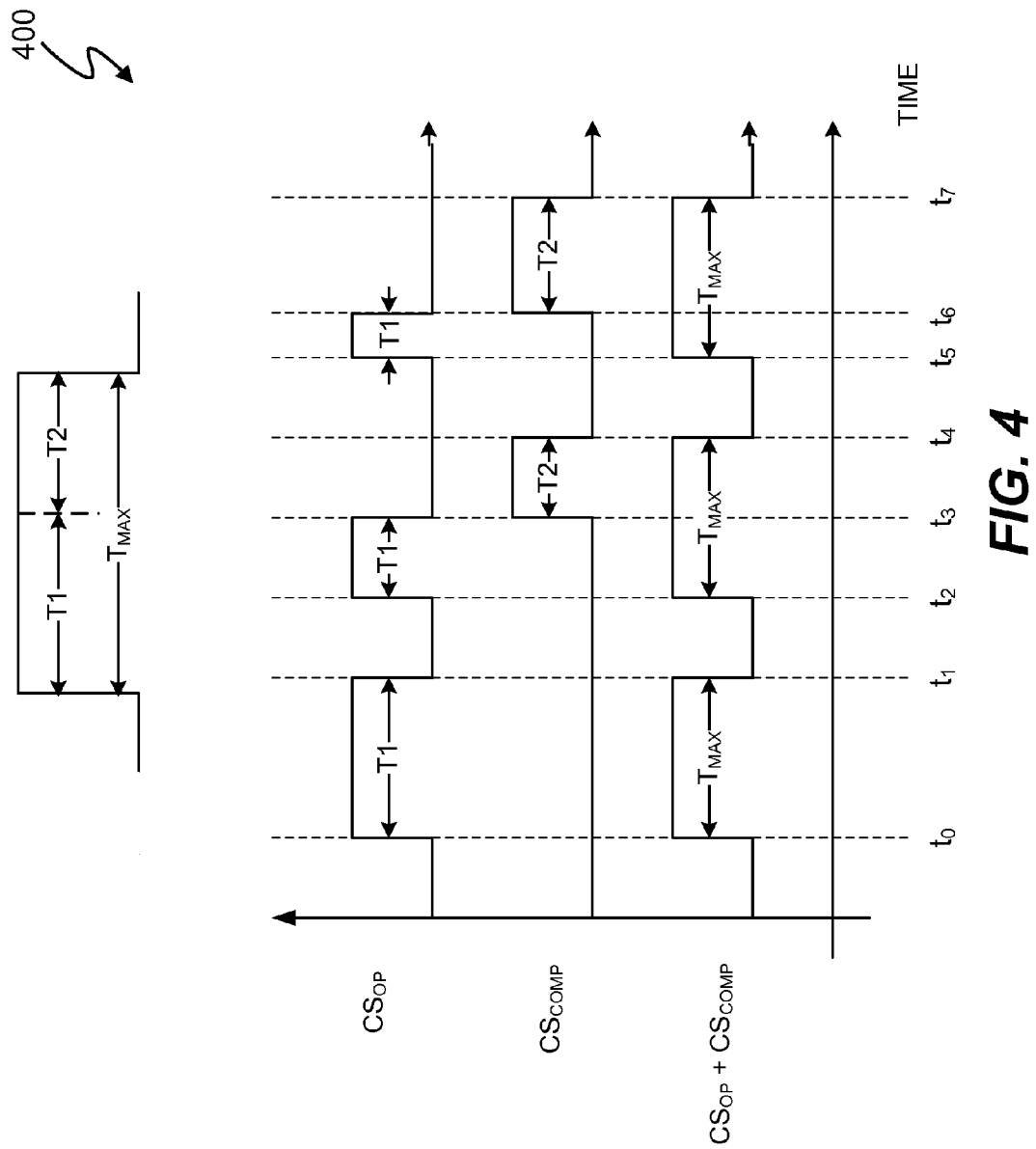
FIG. 4 depicts exemplary current compensation control waveforms for the power distribution system of FIG. 3.

FIG. 4 depicts exemplary current compensation control signal waveforms 400 for the power distribution system 300. Referring to FIGS. 3 and 4, the compensation current control circuit 303 regulates the amount of time for which the current $i_{IN\_TOT}$ is drawn from the voltage supply 306. By regulating the amount of time for which the current $i_{IN\_TOT}$ is drawn, the compensation current control circuit 303 approximately eliminates variations in the amount of current drawn from the voltage supply 306. As previously stated, the current sink 308 represents the total amount of current $i_{IN\_TOT}$ drawn by the controller 302. The total current $i_{IN\_TOT}$ equals the sum of the operational current $i_{OP}$ and the compensation current $i_{COMP}$, i.e. $i_{IN\_TOT} = i_{OP} + i_{COMP}$. The operational current $i_{OP}$ represents the current drawn by controller 302. The operational current $i_{OP}$ includes steady state operations that draw an approximately constant current and includes dynamic operations that draw a time varying current depending on the particular operations performed. An example of a dynamic operations are "probing" operations that probe the input voltage $V_{IN}$ and "glue" operations that provide a holding current for a dimmer, such as the phase-cut dimmer 102, and "power dissipation" operations that dissipate excess power within the power distribution system 300. Exemplary probing, glue, and power dissipation operations are described in commonly assigned to Cirrus Logic, Inc., U.S. patent application Ser. No. 13/539,004, filed on Jun. 29, 2012 and entitled "Input Voltage Sensing for a Switching Power Converter and a Triac-based Dimmer," U.S. patent application Ser. No. 12/858,164, filed on Aug. 17, 2010 and entitled "Dimmer Output Emulation", and U.S. patent application Ser. No. 13/289,845, filed on Nov. 4, 2011, and entitled "Controlled Power Dissipation in a Switch Path of a Lighting System," all of which are incorporated by reference in their entirety and referred to herein as "Operation Applications."

The compensation current control circuit 303 generates compensation control signals $CS_{OP}$ and $CS_{COMP}$ to respectively control conductivity of switches 312 and 314. Switches 312 and 314 can be any type of switches. In at least one embodiment, switches 312 and 314 are field effect transistors (FETs). When the compensation current control circuit 303 generates a pulse of control signal $CS_{OP}$, switch 312 conducts, i.e. is turned "ON", and the controller 302 draws the operational current $i_{OP}$ from the voltage supply 306. Switch 312 represents an exemplary embodiment of first circuitry that, during at least one operational time period of the controller 302, is configured to draw a time varying operational current $i_{OP}$ from the external power source, voltage supply 306. When the compensation current control circuit 303 generates a pulse of control signal $CS_{COMP}$, switch 314 conducts, i.e. is turned "ON", and the controller 302 draws the compensation current $i_{COMP}$ from the voltage supply 306. The switch 314 of controller 302 represents an exemplary embodiment of second circuitry that is coupled to the external power source, voltage supply 306, and receives the compensation current control signal $CS_{COMP}$, which controls conductivity of the switch 314. As shown in FIG. 4, for each cycle of the control signal $CS_{OP}$, the pulse width of the control signal $CS_{OP}$ is T1, and for each cycle of the control signal $CS_{COMP}$, the pulse width of the control signal $CS_{COMP}$ is T2. Since control signals $CS_{OP}$ and $CS_{COMP}$ respectively control conductivity of respective switches 312 and 314, the pulse widths T1 and T2 respectively control the total amount of time $T_{MAX}$ that controller 302 draws the operational current $i_{OP}$ and the compensation current $i_{COMP}$.

The amount of operational current $i_{OP}$ needed during an operational time period of the controller 302, such as a cycle of the input voltage $V_{IN}$, can vary from time period to time period. In at least one embodiment, the controller 302 asserts pulses of the operational control signal $CS_{OP}$, such as at times $t_0$, $t_2$, and $t_5$, until each function of the controller 302 is performed and the operational current $i_{OP}$ is no longer needed. For example, once a probing operation, glue operation, and/or power dissipation operation completes as described in the Operations Applications, the controller 302 deasserts the control signal $CS_{OP}$, such as at times $t_1$, $t_3$, and $t_6$. The compensation current control circuit 303 then determines a time period T2 for which the compensation current control circuit 303 asserts the compensation current control signal $CS_{COMP}$ so that the total current conduction time $T_{MAX}$ for which the total current $i_{IN\_TOT}$ is drawn is approximately constant. In at least one embodiment, the value of $T_{MAX}$ is empirically determined to be a maximum amount of time used by the controller 302 to draw the operational current $i_{OP}$ per cycle of the control signal $CS_{OP}$. The time period T1 from time $t_0$ to time $t_1$ represents an instance when the operational current draw time period T1 is at a maximum and, thus, equals the total current conduction time $T_{MAX}$. Thus, between times $t_0$ and $t_3$, no compensation current $i_{COMP}$ is needed to draw an approximately constant total current $i_{IN\_TOT}$, so the compensation current control signal $CS_{COMP}$ is not asserted (i.e. pulsed) between times $t_0$ and $t_3$.

Figure 5:
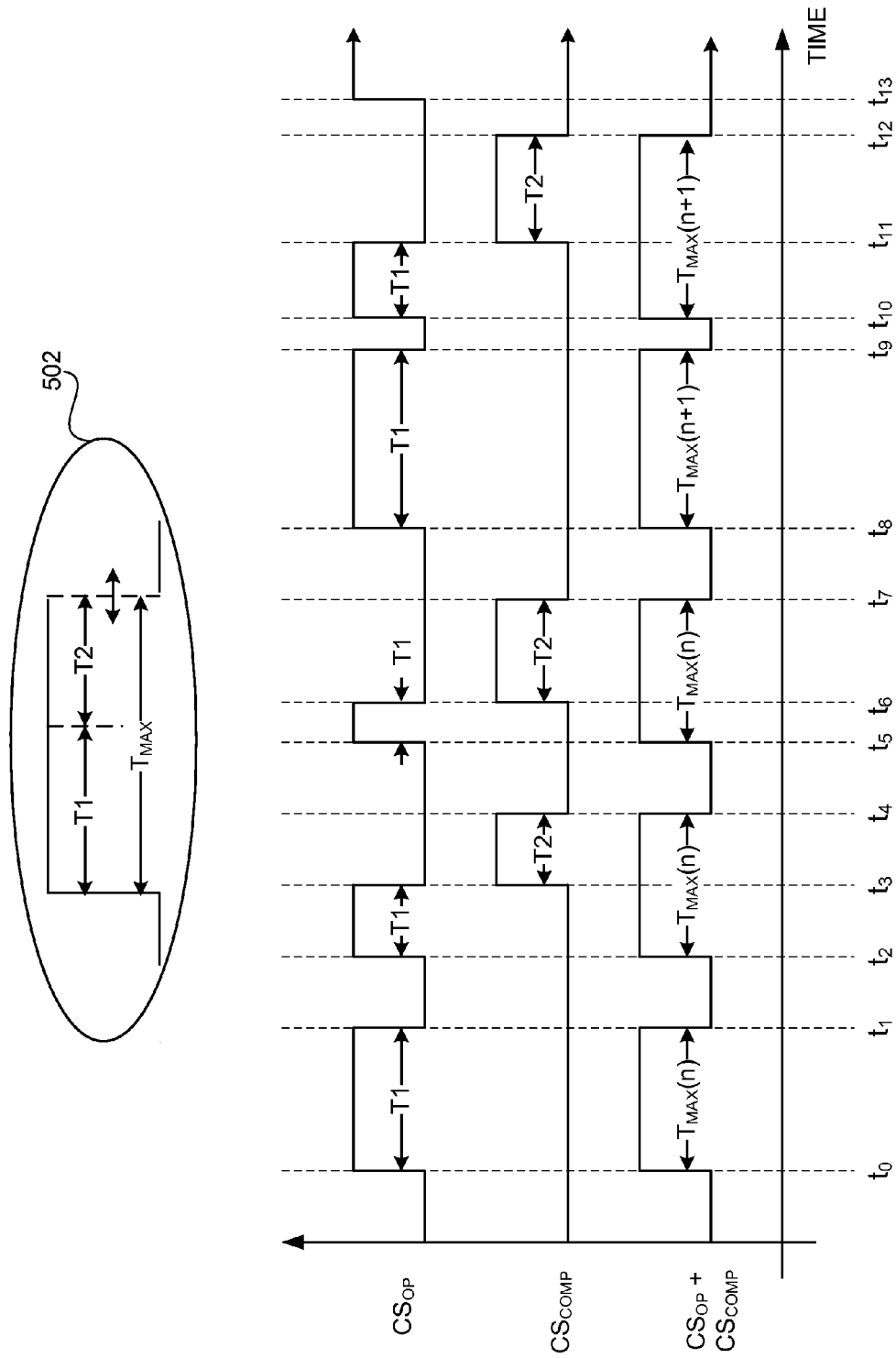
FIG. 5 depicts exemplary current compensation control waveforms for the power distribution system of FIG. 3 with a dynamic total current conduction time period.

FIG. 5 depicts exemplary current compensation control waveforms 500, which represent a dynamic determination of the total current conduction time $T_{MAX}$. Referring to FIGS. 3 and 5 and the total current conduction time $T_{MAX}$ exemplary cycle 502, in at least one embodiment, the compensation current control circuit 303 dynamically determines the total current conduction time $T_{MAX}$. In at least one embodiment, the compensation current control circuit 303 increases the total current conduction time $T_{MAX}$ to equal a maximum time period T1 observed during a cycle of the input voltage $V_{IN}$. Thus, if the controller 302 uses the operational current $i_{OP}$ for a longer period of time than in a previous cycle of the control signal $CS_{OP}$, then controller 302 updates the total current conduction time $T_{MAX}$ to the longer time. In at least one embodiment, an initial value of the total current conduction time $T_{MAX}$ during each cycle of the input voltage $V_{IN}$ is based on a measured dimmer angle, which corresponds to the amount of operational current $i_{OP}$ used by the controller 302 during the cycle. The particular amount of operational current $i_{OP}$ used by the controller 302 is a function of the individual controller 302 implementation and can, in at least one embodiment, be determined mathematically or empirically.

For example, the nth total current conduction time $T_{MAX}(n)$ is the same between times $t_0$ and $t_8$, where n is an integer index. Between times $t_8$ and $t_9$, the conduction time T1 of the operational current $i_{OP}$ exceeds the value of $T_{MAX}(n)$, so the compensation current control circuit 303 increases the total current conduction time $T_{MAX}(n+1)$ to the conduction time T1 between $t_8$ and $t_9$, and so on.

The conduction path through which the switch 314 conducts the compensation current $i_{COMP}$ is a matter of design choice. In at least one embodiment, controller 302 conducts compensation current $i_{COMP}$ internally through path P1. Conducting the compensation current $i_{COMP}$ internally through path P1 results in all power dissipation of compensation current $i_{COMP}$ occurring within the controller 302. To reduce the thermal burden of power dissipation within the controller 302, in at least one embodiment, the power distribution system 300 includes a dissipation circuitry 316 in a conduction path P2. Conducting the compensation current $i_{COMP}$ in path P2 through the dissipation circuitry 312 dissipates power outside of the controller 302. The particular dissipation circuitry 316 is a matter of design choice. In at least one embodiment, the dissipation circuitry 316 is a resistor. In at least one embodiment, the power distribution system 300 includes conduction path P1 or P2. In at least one embodiment, the power distribution system 300 includes both conduction paths P1 and P2 to distribute power dissipation between the controller 302 and the dissipation circuitry 316. The optional DIM input signal represents dim level information from a dimmer, such as phase-cut dimmer 102. In at least one embodiment, the DIM input signal represents a sample of the input voltage $V_{IN}$.

The particular implementation of the controller 302 is a matter of design choice. In at least one embodiment, the controller 302 is implemented as an integrated circuit that includes hardware components that are configured to implement the functionality of the controller 302 including the compensation current control circuit 303. In at least one embodiment, the controller 302 includes a memory (not shown) that includes code that is executable by and, thus, programs a processor (not shown) of the controller 302 to implement the functionality of the controller 302.

Although FIGS. 4 and 5 depict the total current conduction time $T_{MAX}$ as constant for each cycle of the compensation control signal $CS_{OP}$, in other embodiments, the average value of the total current conduction time $T_{MAX}$ is constant over an operational time period. When the operational time period consists of multiple cycles of the compensation control signal $CS_{OP}$, the total current conduction time $T_{MAX}$ can vary from a mean value but the average value is constant over an operational time period. In at least one embodiment, the operational time period is a half line cycle of a, for example, 60 Hz supply voltage. Thus, since the average total current conduction time $T_{MAX}$ is constant over a $1/60^{th}$ second operational time period, any variations of total current conduction time $T_{MAX}$ are not perceptible by a human eye.

In at least one embodiment, the power distribution system is a lamp and the load 305 is a light source, such as one or more light emitting diodes.

Figure 6:
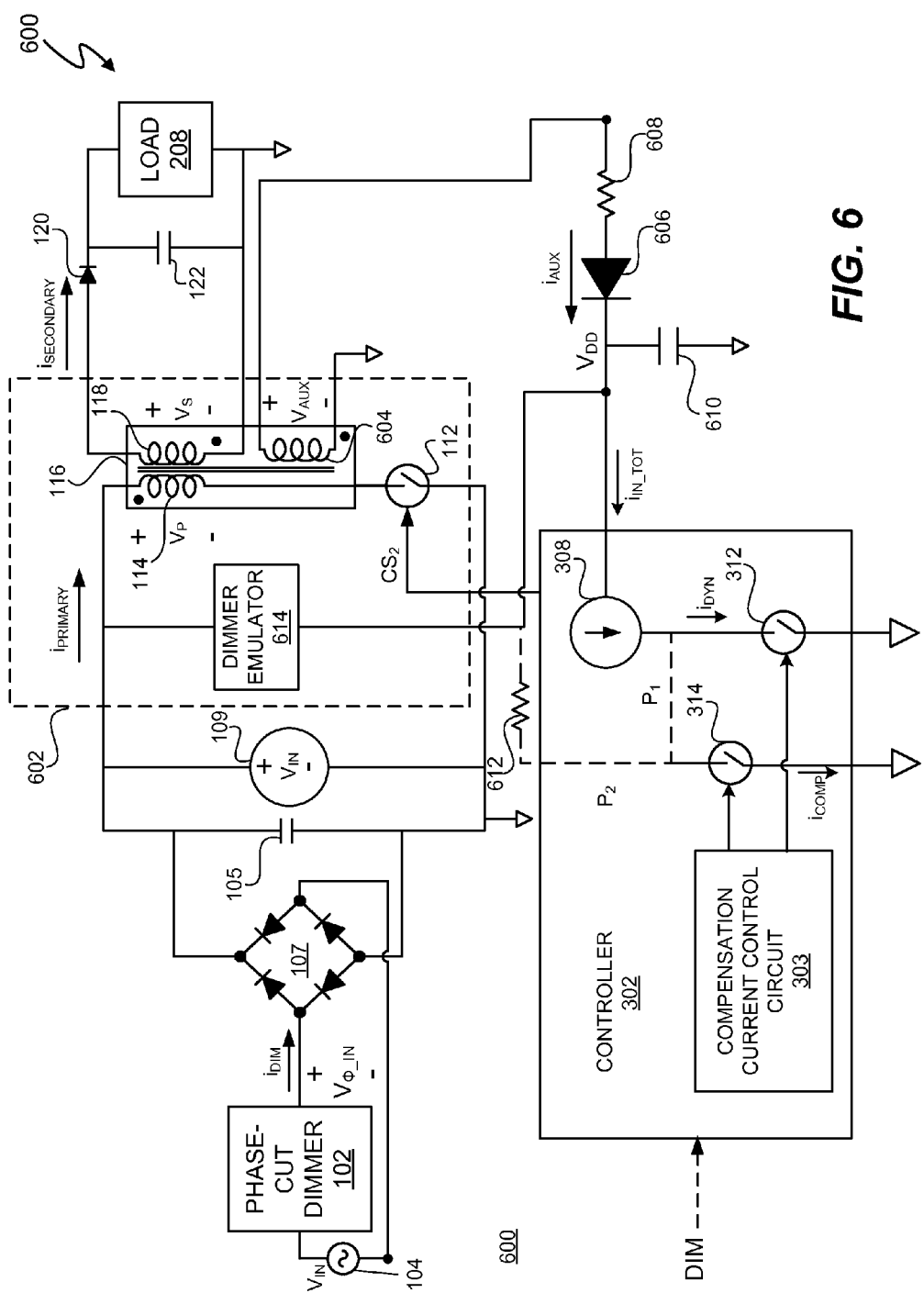
FIG. 6 depicts an embodiment of the power distribution system of FIG. 3.

FIG. 6 depicts an exemplary power distribution system 600, which represents one embodiment of the power distribution system 300. In at least one embodiment, components with element numbers also present in power distribution system 100 (FIG. 1) operate as previously described. The switching power converter 602 differs from the switching power converter 110 by including a secondary-side auxiliary-winding 604 that generates an auxiliary voltage $V_{AUX}$. When the auxiliary voltage $V_{AUX}$ forward biases the diode 606, the auxiliary-winding generates an auxiliary current $i_{AUX}$ that flows through resistor 608 and diode 606 to charge capacitor 610 to voltage $V_{DD}$. The energy stored in capacitor 610 provides the total input current $i_{IN\_TOT}$ to controller 302. The resistor 612 represents one embodiment of the dissipation circuitry 316. Dimmer emulator 614 represents one embodiment of a glue circuit, which maintains a holding current for the phase-cut dimmer 102 and can cause variations in the operational current $i_{OP}$. Previously cited U.S. patent application Ser. No. 12/858,164 describes an exemplary dimmer emulator 614.

In FIG. 6, any variation in the total input current $i_{IN\_TOT}$ drawn by controller 302 varies the auxiliary current $i_{AUX}$, which causes variations in the auxiliary voltage $V_{AUX}$. Variations in the auxiliary voltage $V_{AUX}$ reflect to the primary-side winding 114 and the secondary-side winding 118. The variations in the secondary-side winding 118 vary the secondary current $i_{SECONDARY}$, which varies the power delivered to the load 208.

The controller 302 generates the control signal $CS_2$ to control the switching power converter 602. In at least one embodiment, the control signal $CS_2$ is a pulse width modulated signal, and the controller 302 determines the pulse width of control signal $CS_2$ to maintain the primary-side current $i_{PRIMARY}$ within a predetermined range. In at least one embodiment, the predetermined range is dictated by the component values of transformer 116, diode 120, capacitor 122, and the power demand of load 208. The particular manner of generating control signal $CS_2$ is a matter of design choice. Exemplary systems and methods for generating the switch control signal $CS_2$ are described in, for example, U.S. patent application Ser. No. 13/174,404, entitled "Constant Current Controller With Selectable Gain", assignee Cirrus Logic, Inc., and inventors John L. Melanson, Rahul Singh, and Siddharth Maru, and U.S. patent application Ser. No. 12/919,086, filed on Jun. 1, 2012, entitled "Primary-Side Control of a Switching Power Converter With Feed Forward Delay Compensation", assignee Cirrus Logic, Inc., inventors Zhaohui He, Robert T. Grisamore, and Michael A. Kost, which are both hereby incorporated by reference in their entireties.

Thus, a power distribution system and method includes a controller that is configured to control a switching power converter. In at least one embodiment, the controller includes a compensation current control circuit to control a compensation current that reduces and, in at least one embodiment, approximately eliminates variations in current drawn by the controller during a particular operational time period.

Although embodiments have been described in detail, it should be understood that various changes, substitutions, and alterations can be made hereto without departing from the spirit and scope of the invention as defined by the appended claims.

What is claimed is:

1. An apparatus comprising:
   a controller to control a switching power converter, wherein the controller includes:
   first circuitry that, during at least one operational time period of the controller, is configured to draw a time varying operational current from an external power source; and
   a compensation current control circuit to generate a compensation current control signal to control a draw of a compensation current from the external power source by second circuitry so that an average sum of the time varying operational current and the compensation current is approximately constant as the operational current varies in time during the operational time period.

2. The apparatus of claim 1 wherein:
   the controller further includes the second circuitry, the secondary circuitry is coupled to the external power source, the second circuitry includes a switch having a control terminal to receive the compensation current control signal, and the compensation current control signal control conductivity of the switch.

3. The apparatus of claim 1 wherein:
   the secondary circuit is coupled to the external power source and includes a resistor coupled in series with a switch, and the resistor is external to the controller and the switch is included in the controller.

4. The apparatus of claim 1 wherein the external power source comprises an auxiliary-winding of a transformer in a flyback switching power converter.

5. The apparatus of claim 1 wherein during each voltage cycle of the external power supply, the first circuit draws current for a first period of time and the compensation current control circuit is configured to generate the compensation current control signal to control current draw from the external power source by the second circuitry for a second period of time, the second period of time immediately follows the first period of time, and the compensation current control circuit is configured to control the current draw from the external power source by the second circuitry so that the first period of time plus the second period of time is approximately constant.

6. The apparatus of claim 1 wherein the sum of the time varying operational current and the compensation current represents a total amount of current drawn by the controller.

7. The apparatus of claim 1 wherein the time varying operational current comprises a probe current controlled by the controller.

8. The apparatus of claim 1 wherein the controller is configured to control the switching power converter to provide power to a load.

9. The apparatus of claim 1 wherein the load comprises one or more light emitting diodes.

10. The apparatus of claim 1 wherein the operational period is a time period equal to a half line cycle of a rectified supply voltage to the switching power converter.

11. The apparatus of claim 1 wherein the compensation current control circuit is configured to generate the compensation current control signal to control the draw of the compensation current from the external power source by second circuitry so that the time varying operational current and the compensation current is approximately constant as the operational current varies in time.

12. The apparatus of claim 1 wherein the compensation current control circuit is further configured to disable the compensation current control signal when the controller controls the switching power converter to provide a full output power.

13. A method comprising:
   drawing a time varying operational current in a first circuit of a controller from an external power source during at least one operational time period of the controller, wherein the controller is configured to control a switching power converter; and
   generating a compensation current control signal to control a draw of a compensation current from the external power source by second circuitry so that an average sum of the time varying operational current and the compensation current is approximately constant as the operational current varies in time during the operational time period.

14. The method of claim 13 further comprising:
   applying the compensation current control signal to a switch having a control terminal to receive the compensation current control signal to control the compensation current.

15. The method of claim 13 further comprising:
   conducting the compensation current through a dissipating circuit that is external to the controller.

16. The method of claim 13 wherein the external power source comprises an auxiliary-winding of a transformer in a flyback switching power converter.

17. The method of claim 13 further comprising:
   during each voltage cycle of the external power supply, drawing current in the first circuit for a first period of time;
   generating the compensation current control signal to control current draw from the external power source by the second circuitry for a second period of time, the second period of time immediately follows the first period of time; and
   controlling the current draw from the external power source by the second circuitry so that the first period of time plus the second period of time is approximately constant.

18. The method of claim 13 wherein the sum of the time varying operational current and the compensation current represents a total amount of current drawn by the controller.

19. The method of claim 13 wherein the time varying operational current comprises a probe current controlled by the controller.

20. The method of claim 13 further comprising:
   controlling the switching power converter to provide power to a load.

21. The method of claim 13 wherein the load comprises one or more light emitting diodes.

22. The method of claim 13 wherein the operational period is a time period equal to a half line cycle of a rectified supply voltage to the switching power converter.

23. The method of claim 13 wherein generating the compensation current signal further comprises:
   generating the compensation current control signal to control the draw of the compensation current from the external power source by second circuitry so that the time varying operational current and the compensation current is approximately constant as the operational current varies in time.

24. The method of claim 13 further comprising:
   disabling the compensation current control signal when the controller controls the switching power converter to provide a full output power.

25. A lamp comprising:
   a light source;
   a switching power converter coupled to the light source; and
   a controller, coupled to the switching power converter, to control a switching power converter, wherein the controller includes:
      first circuitry that, during at least one operational time period of the controller, is configured to draw a time varying operational current from an external power source; and
      a compensation current control circuit to generate a compensation current control signal to control a draw of a compensation current from the external power source by second circuitry so that a sum of the time varying operational current and the compensation current is approximately constant as the operational current varies in time.

26. The lamp of claim 25 the light source comprises one or more light emitting diodes.

* * * * *